United States Patent
Hasinger

[11] 3,867,033
[45] Feb. 18, 1975

[54] MULTI-COMPONENT FLOW PROBE
[75] Inventor: Siegfried H. Hasinger, Dayton, Ohio
[73] Assignee: The United States of America as represented by the Secretary of the Air Force, Washington, D.C.
[22] Filed: June 4, 1973
[21] Appl. No.: 366,908

[52] U.S. Cl.................. 356/103, 250/227, 356/208, 350/96 R
[51] Int. Cl. ............................................ G01n 21/00
[58] Field of Search ........... 356/103, 104, 208, 244; 250/227; 350/96 B, 96 R

[56] References Cited
UNITED STATES PATENTS
| | | | |
|---|---|---|---|
| 2,892,378 | 6/1959 | Canada | 356/104 |
| 3,136,310 | 6/1964 | Meltzer | 250/227 |
| 3,278,738 | 10/1966 | Clark | 350/96 B |
| 3,357,433 | 12/1967 | Fourestier | 350/96 B |

Primary Examiner—Ronald L. Wibert
Assistant Examiner—Conrad Clark
Attorney, Agent, or Firm—Harry A. Herbert, Jr.; Robert Kern Duncan

[57] ABSTRACT

A multi-component flow probe for determining the characteristics, such as the presence of voids, in heavily loaded multi-component flows, either columnar or in rotating fluidized beds, is provided by using a wedge-shaped fiber optic rod transmitting light into the flow and detecting the light reflected by the flow through an adjacent wedge-shaped fiber optic rod. The wedge of the rod points upstream the general flow direction. The angle and shape of the point of the wedge of the fiber rods are relatively critical.

2 Claims, 16 Drawing Figures

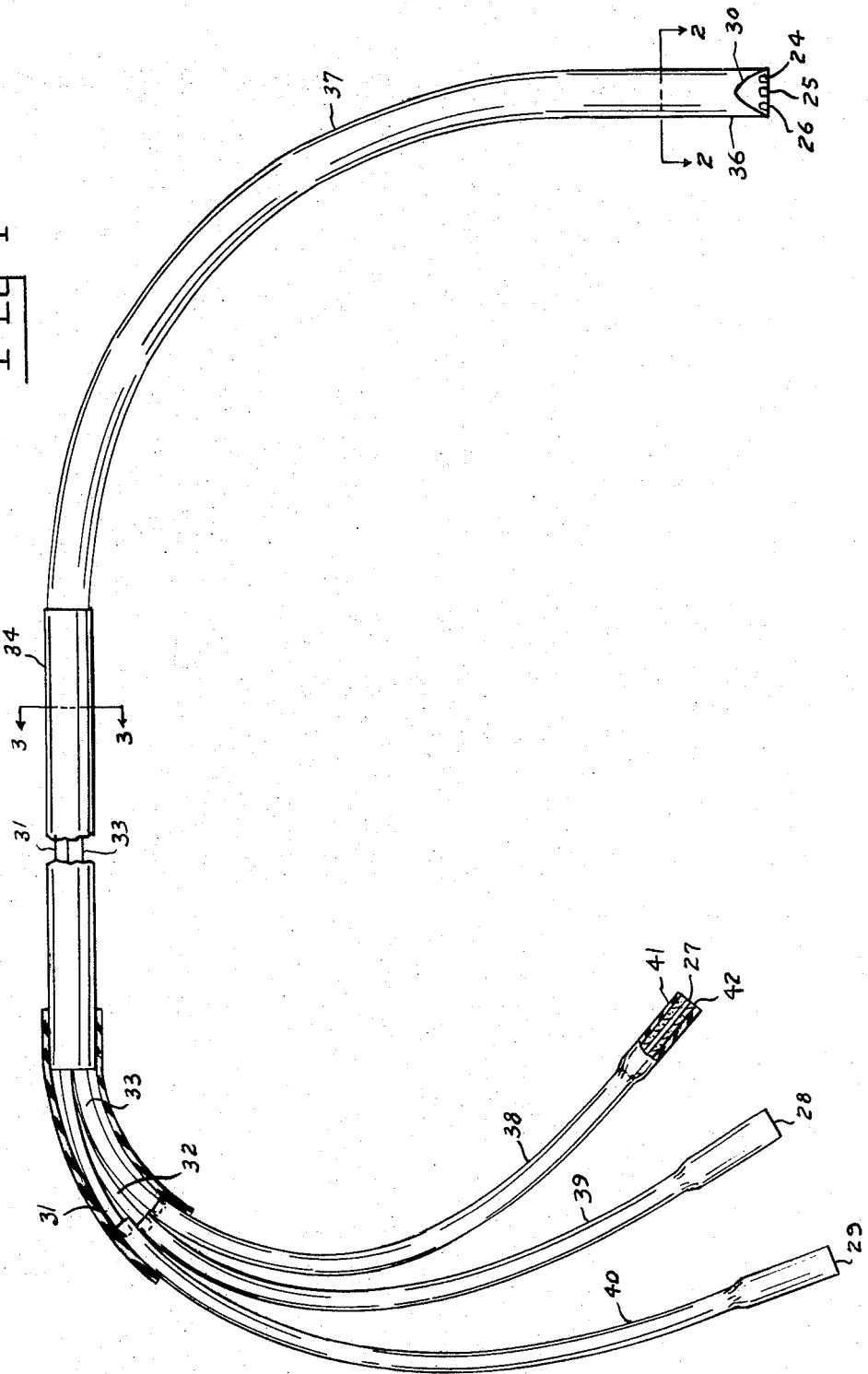

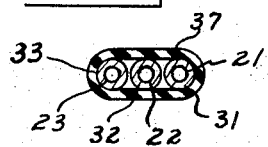
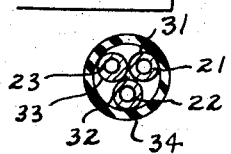
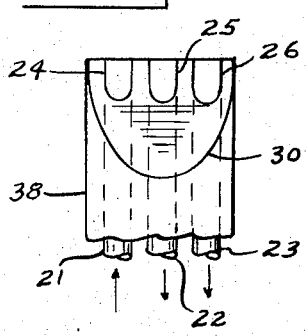
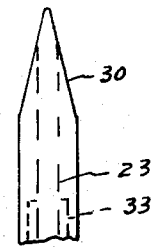
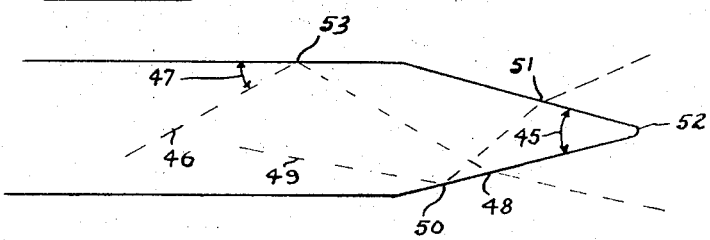
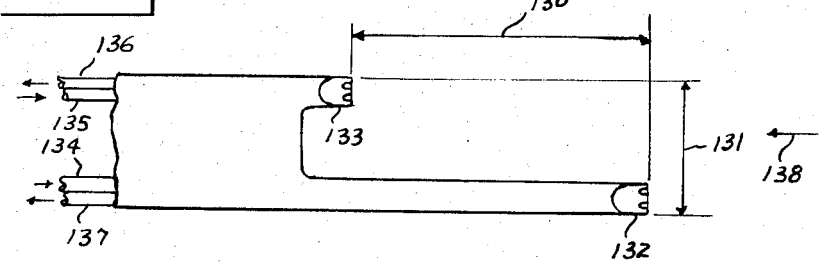

Fig-6
Fig-7
Fig-8
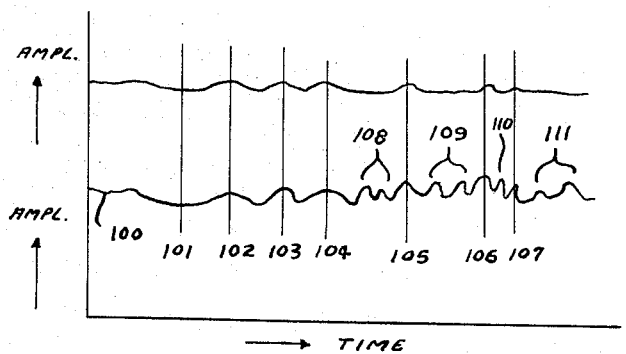
Fig-12
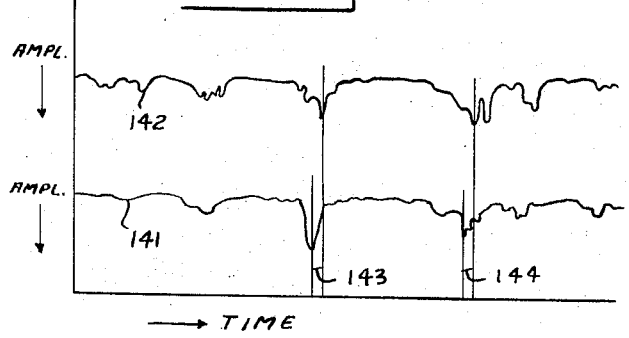
Fig-14

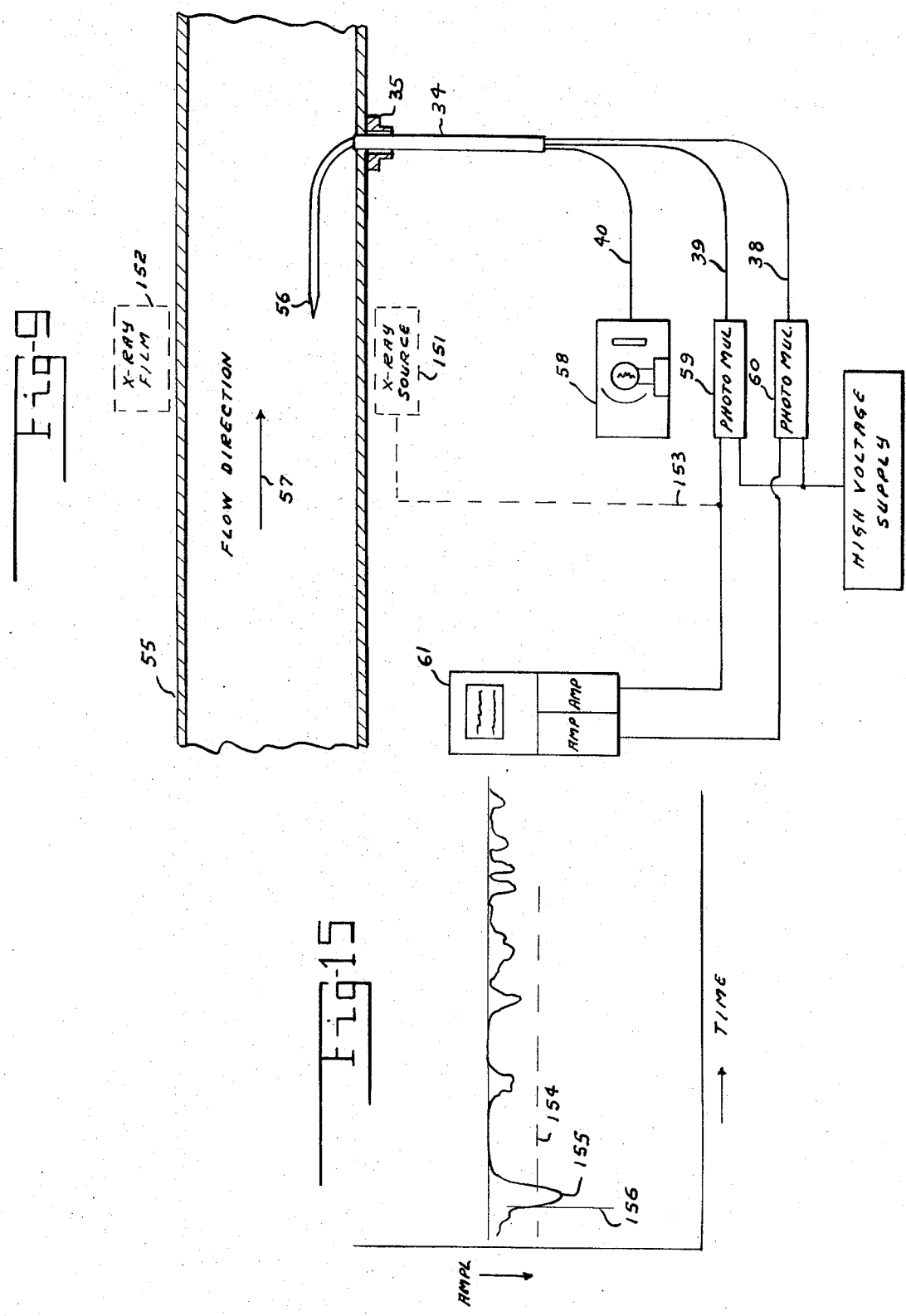

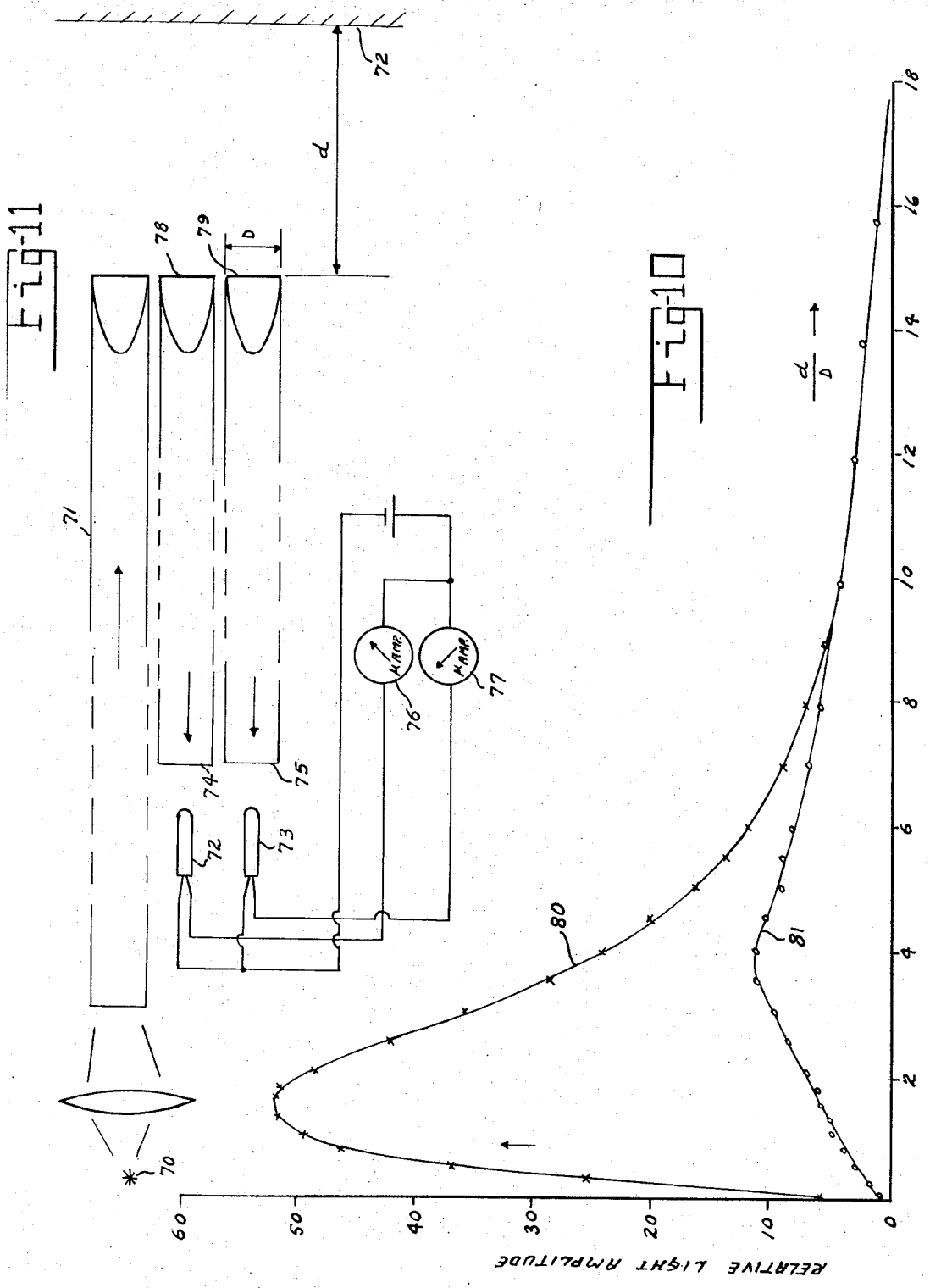

MULTI-COMPONENT FLOW PROBE

RIGHTS OF THE GOVERNMENT

The invention described herein may be manufactured and used by or for the Government of the United States for all governmental purposes without payment of any royalty.

BACKGROUND OF THE INVENTION

The field of the invention is in the light probe inspection art.

The use of fiber optics to observe light effects produced by an illuminating source in positions not directly observable is well known. Typical examples of such prior art devices are exemplified by U.S. Pat. Nos. 3,462,608 to C. D. Weston et al., 3,564,264 to R. F. Karuha et al., and 3,619,068 to A. B. Broerman. None of the known prior art devices have been found to be suitable for use in heavily loaded multi-component flows. They all become rapidly clogged or deteriorated from particle deposition. In addition the prior art devices generally cause serious disturbances, detrimental to the flow, and give erroneous indications of the flow characteristics.

SUMMARY OF THE INVENTION

The invention provides a diagnostic instrument for use in the study of the flow characteristics and component distributions within heavily loaded multi-component flows. It is suitable for use in columnar and rotating (swirl) flows. Particle density fluctuations, presence and size indications of voids in the flow, and flow velocities may readily be determined. The disclosed probes cause negligible disturbance to the flow, they are not subject to clogging, and they do not suffer any deterioration from particle deposition. The disclosed invention provides apparatus with which determinations of particle loading densities and the occurrence of inhomogeneities in a highly loaded multi-component flow may be made that heretofore have been unobtainable. Specifically, the study and determination of the flow characteristics pertinent to colloid core nuclear reactors wherein rotating flows, loaded with fine particles in the order of 100 times the weight of the carrier gas are employed, have now been made with the apparatus of the invention.

BRIEF DESCRIPTION OF THE DRAWING

FIG. 1 is a pictorial view of a typical embodiment of the invention.

FIG. 2 is a representative cross section view near the wedge end of the probe of FIG. 1;

FIG. 3 is a representative cross section view near the center of the probe assembly of FIG. 1;

FIG. 4a is an enlarged schematic view of the wedge-shaped end of a typical three-fiber rod probe;

FIG. 4b is a schematic side view of the wedge end shown in FIG. 4a;

FIG. 5 is a representative schematic view showing optical paths in a fiber rod having a wedge-shaped end;

FIG. 6 is a representation of a photographic picture showing the light radiation pattern from a fiber optic rod having a greater than thirty degree wedge angle;

FIG. 7 is a representation of a photographic picture of the light radiation pattern from a fiber optic rod having a sharp thirty degree wedge;

FIG. 8 is a representation of a photographic picture of the light radiation of the fiber optic rod shown in FIG. 7 with the knife edge of the wedge rounded;

FIG. 9 is a pictorial-schematic view of a typical embodiment of a probe with typical associated electrical and electronic equipment;

FIG. 10 is a typical calibration plot of an embodiment of a typical three-fiber rod probe;

FIG. 11 is a schematic diagram of the calibration system for obtaining the plot shown in FIG. 10;

FIG. 12 is a copy of typical traces of a two-beam oscilloscope display showing discontinuities in a typical heavily loaded flow as detected by an embodiment of the invention;

FIG. 13 is a schematic view of a typical embodiment of a probe particularly suitable for measuring flow velocities;

FIG. 14 is a copy of typical traces of a two-beam oscilloscope using the probe embodiment shown in FIG. 13 showing representative flow velocities; and FIG. 15 is a copy of an oscilloscope trace of the output from an embodiment of a fiber optic rod probe showing how the output may be used to trigger x-ray equipment.

DESCRIPTION OF THE PREFERRED EMBODIMENT

An enlarged pictorial view of a generally preferred embodiment of the invention is shown in FIG. 1, with cross sections 2 and 3 shown in FIGS. 2 and 3. In this particular embodiment three solid fiber optic rods 21, 22, and 23 are used. The individual rods terminate at one end, 24, 25, and 26 in a ground and polished blunt wedge configuration 30. The other ends of the fiber optic rods 27, 28, and 29 are flat, substantially perpendicular to their rod axes, and polished for maximum light transmission. In order to prevent light coupling between the fiber optic rods it is required that they be light insulated from each other along their lengths. In this embodiment this is done by placing each rod in separate stainless steel tubes 31, 32, and 33 respectively, over that portion of their length extending into the multi-component flow. The stainless steel tubes provide strength and rigidity to the fiber rods and provide light insulation yet provide for the probe being shaped to point against the direction of component flow. That portion of the probe passing through the container wall into the confined space through which the multi-component flow is passing is further enclosed in a round metallic tube 34 for convenient fastening to the flow container wall, such as by a conventional compression flange 35 as shown in FIG. 9. The three-fiber rods 21, 22, and 23 at the active end 36 of the probe are aligned in line parallel arrangement as shown in FIG. 2. The art of fiber optics is well known. Fiber optic elements are also frequently known as fiber optic light guides, as light pipes, and when used in coherent bundles as image conduits. For this invention the term fiber optic rod refers to a conventional, solid, single fiber, element. It is also frequently referred to as a single, individual, fiber optic strand. The fiber rods extend past the ends of the stainless steel tube as shown in the schematic side view of FIG. 4b. A conventional heat shrinkable plastic tube 37 covers the three stainless steel tubes. It is shrunk to them and to the round tube 34 forming a sealed assembly. The ends of the fiber rods protruding from the stainless steel tubes, the ends of the stainless steel tube, and the end of the heat shrunk plastic covering tube are dipped in black epoxy cement to provide a light insulating support 38 for the fiber rods on which the wedge shape 30 may be ground. Thus, the ends of the fiber optic rods 24, 25, and 26 are ground with the epoxy covering 38 to form a common wedge as shown in the side view in FIG. 4b. The other ends of the fiber optic rods extend from the ends of the stainless steel tubes 31, 32, and 33 a suitable length (approximately one foot is satisfactory) for convenient separate coupling to a light source and light detecting devices. Heat shrunk tubing 38, 39, and 40 covers the fiber rods and the ends of the stainless steel tubes 31, 32, and 33. The ends of the fiber rods are surrounded with a larger heat shrinkable plastic tube 41 filled around each fiber rod with black epoxy cement so that the ends of the assembly including the ends of the fiber rods 27, 28, and 29 may be ground flat and polished.

The shape of the blunted wedge end of the probe is relatively critical. One, it must be able to efficiently direct light, and be receptive to light, from a direction in front of the probe; two, it must not be rendered ineffective due to an accumulation of particles on its light transmitting and receiving surface; and three, it must not disrupt the flow so as to cause discontinuities in the flow and give erroneous indications. It is well known that light leaving a light conducting fiber rod with a square cut off (i.e., a flat face perpendicular to the fiber axis) is spread out under an angle of about 30° with the fiber axis. However, a square cut rod cannot be used satisfactorily because it very soon becomes opaque with particle accumulation and flow disruptions occur around the flat surface. It has been found that the blunted wedge shape shown in FIG. 5 will transmit (and be receptive to) light in an approximately 60° solid fan pattern ahead of the probe; that it will not clog with accumulated particles (it is self cleaning due to the wiping flow across its faces), and it will not give false indications or cause any appreciable disruptions in the flow. A 30° included angle 45, FIG. 5, between the wedge faces has been found to be the optimum and preferred wedge shape. The light ray 46 striking the fiber wall at an angle 47 of 30° is typical for substantially the limiting condition in a light conducting fiber. This ray substantially leaves the probe head through the slanted side 48 from its reflection 53 from the fiber wall. However, any reflected portion of the ray at point 48 will pass essentially unimpeded through the other slanted side of the wedge. Ray 49 represents the direction of the light as it most generally occurs in the fiber. (Of course, symetry occurs in all radial planes in the fiber, the two rays 46 and 49 are merely representative conditions.) This ray 49 due to its low angle of incidence with the slanted surface of the wedge is totally reflected at point 50. However, it arrives at the opposite slanted surface 51 with a large enough angle to penetrate the surface of the wedge where refraction bends it toward the probe axis. Any reflected light (within the probe) at point 51 will leave the probe from the opposite side. Thus, nearly all the light travelling in the fiber will leave the probe in the direction of the probe (assuming, of course, that the slanted surfaces of the wedge are optically smooth), except for the condition as best may be understood by referring to FIGS. 6, 7, and 8.

FIG. 6 is a representation of a photograph of the light pattern from a sharp wedge having an included angle between the wedge faces of more than 30°. It can be seen that substantially two relatively broad, separate beams of light occur, one from each wedge surface. This is an undesirable light pattern for the invention. FIG. 7 is a representation of a photograph of the light pattern from a sharp wedge having the preferred included wedge angle of 30°. It is to be observed that a substantial void in the pattern occurs directly ahead of the wedge. It has been found that forming a slight radius to the tip of the wedge, that is, changing the knife edge to a slightly blunted point will provide the desired light pattern shown in FIG. 8, and as shown at 52 in FIG. 5. It has been found that the preferred radius of the tip 52 for this invention is approximately equal to the average particle diameter of the flow in which the probe is used. Thus, the preferred blunted wedge shaped probe for this invention has an included wedge angle of 30° and a tip radius approximately equal to the average particle diameter in the flow in which it is used. Wedges having included angles from 25° to 35° may be used however, with some degradation in light efficiency. Likewise, tip radii variations from average particle radius to approximately ten times average particle radius may also be used. Generally the flatter wedges, greater than 30°, and larger tip radii spread the light more and lose efficiency and tend to collect or build up with particle accumulation also losing light efficiency. The thinner wedges having less than 30° included angle, and smaller tip radii in addition to being difficult to fabricate and fragile, generally have too narrow a beam, and light transmission decreases particularly near the axis of the beam. When looking head-on at an illuminated blunted wedge-shaped tip it appears as a fairly narrow line source of light. In the wedge-shaped probe having plane slanted surfaces most of the light reflected on the non-slanted portion of the probe head, by reflection, eventually reaches the slanted portion and leaves the probe. Since the fiber rods, conducting light into and out of the flow, are light insulated from each other along their lengths and between the fibers at the probe head, light can only enter and leave the probe head end of the fiber optic rod from the slanted wedge surfaces and the rounded tip of the fiber wedge. It is preferable to grind and polish the wedge head as a unit. That is, the ends of the individual fiber rods, spaced apart, protruding from the metallic conduit supports, are coated by dipping in black epoxy forming an oval tubular shaped light insulating coating around the rods. The wedge shape and tip radius is then ground on the assembly and the surfaces polished to provide the conventional optical surface.

Generally, the plastic type fiber optic fiber rods, such as lucite, are preferred due to ease of fabrication, however, glass fibers or other conventional fiber optic materials may be used in the invention. Generally, single fiber rods are preferred to fiber optic bundles. In addition to using black epoxy cement for encasing the fiber rods black lucite paint may be used.

Typical three-fiber rod embodiments of the invention have been constructed as shown in FIG. 1 with a probe head shape as shown in FIGS. 4a and 4b using fiber optical rods having diameters of 0.02 inch, resulting in overall head dimensions just back of the wedge of about 0.1 inch by 0.05 inch. The diameter of the outside tube 34 is approximately ⅛ inch. Smaller embodiments using 0.01 inch diameter fiber rods with corresponding smaller head and overall sizes have also been very satisfactorily used. The smaller probes provide less disturbance to the flow but are generally weaker and not as suitable for use in violent flows.

Typical of multi-component flows investigated, in both swirl (vortex) chambers and columnar flows, with the aid of this invention have been powders (or dusts) of talc with mean particle diameters of 20μ. Flows of solid to gas (air) mass density ratios as high as 100 to 1 with typical particle densities of 2.7 gm/cm³, and with flow velocities from 5 to 10 meters per second have been extensively examined without any detectable probe deterioration. The probe is also entirely suitable for extensive use in similar metallic particle flows. The operation of this invention has shown (as will be further described) that voids in the multi-component flows do occur, that they form and dissipate, and readily take on all random forms of sizes and shapes.

In a typical embodiment of the invention as shown in FIGS. 1, 2, 3, 4a, 4b, one of the outer fibers is used (such as fiber 21) to bring light from an outside light source to illuminate the area ahead of the probe. Depending on the conditions in the flow, i.e., on the particle distribution in the flow, the light will be scattered in different patterns. The other two fibers 22 and 23 will therefore receive reflected, scattered, light of different characters depending on the conditions in the flow. Since each of the two receiving fibers 22 and 23 receive and provide individual signals an analysis of the flow may be made. In uniform dense flows a very small amount of reflected light of constant intensity may appear at the output of the receiving fiber 22 adjacent to the transmitting, fiber 21. In extremely dense uniform flows substantially no light output occurs from either receiving fiber. If, however, there is a cavity ahead of the probe, light will be reflected from the far wall (or walls) of the cavity and depending on the size and shape of the cavity light output will occur from the adjacent receiving fiber or from both receiving fibers for larger cavities.

A typical embodiment diagnostic system for columnar multi-component flows is shown schematically in FIG. 9. (For probe dimensions of 0.05 inch by 0.1 inch, as previously detailed, the disruption to the flow in conduits 55 of over ½ inch in diameter, is negligible.) As previously stated the wedge 56 of the probe is positioned to point against the flow direction 57. The probe, when constructed as previously set forth, is readily bendable so that it may be positioned, as desired, within the flow yet it is sufficiently rigid to maintain this position against the flow energy. A conventional light source 58 is used to direct light into the transmitting fiber 21 inside flexible lead 40. The flow directly ahead of wedge 24 is thus illuminated. Light picked up by the receiving fibers wedges 25 and 26 is carried by the flexible, individually light insulated leads 38 and 39 to the exterior conventional photomultipliers 59 and 60. The outputs of the photomultipliers are further separately amplified in the conventional two-beam oscilloscope 61 and separately displayed on the common oscilloscope time base. Generally, the same amount of gain (amplification) is used for each channel. However, different gains in the two channels may be used as those using this invention became more skilled in its operation. FIG. 12 is a copy of a typical oscilloscope picture (with equal amplifier gains) of a multi-component flow. The lower trace 100 is from the receiving wedge 25 adjacent the light transmitting wedge 24. The upper trace is from the far wedge 26. At time 101 it is to be noted that substantially no return was received by either receiving wedge of the probe indicating a very dense homogeneous flow over the probe. Voids occurred in the flow sufficiently large to encompass both receiving wedges at times 102 through 107 while smaller voids just encompassing the adjacent receiving wedge occurred times 108, 109, 110, and 111. Those using this invention soon acquire skill in analyzing the characteristics of the flow from the amplitudes and durations of the reflections picked up by the receiving wedges. A typical calibration of a typical three-fiber rod embodiment of the invention as shown in FIG. 1 is shown in FIG. 10. The calibration setup used in making the calibration is schematically diagrammed in FIG. 11. The light from the light source 70 is directed on the ground and polished end of the light transmitting fiber rod 71. A light reflecting surface 72 is varied in distance $d$ from the ends of the wedges. The calibration is made in terms of relative light intensity vs. $d/D$ where $D$ is the diameter of the fiber rods. Photodiodes 72 and 73 pick up the light from the receiving fiber optic rods 74 and 75. The current flows in microameters 76 and 77 are a measure of the relative light intensities received respectively by the wedges 78 and 79. The fiber rods are light insulated to prevent any direct light from one rod entering another rod. The response of the fiber 74 adjacent to the transmitting fiber 71 is shown by curve 80. Curve 81 shows the response of fiber rod 75.

Another embodiment of the invention, particularly suited for measuring flow velocities, is shown in FIG. 13. In this embodiment two, two-fiber rod heads (constructed as previously set forth for the other embodiments) are separated a determined distance 130 along the flow direction. (Both wedges point against the flow direction 138.) In a typical embodiment of the invention this distance 130 is approximately 0.2 inch. The exact value is not critical, however, the separation must be known to determine absolute velocity. A typical value of the transverse separation of the heads 131, with respect to the flow direction 138, is approximately 0.1 inch. This transverse separation is not critical and need not be known for flow velocity measurements. In operation the time interval between the occurrence of a void at head 132 and its appearance at head 133 divided into the spacing 130 between heads gives the velocity of the flow. One fiber optic rod in each head transmits light into the flow, i.e., fibers 134 and 135. The light receiving fibers 136 and 137 are connected to photomultipliers such as 59 and 60 (FIG. 9) and the relative amplitudes of the received light is displayed on a common time base on a two-beam oscilloscope 61 as described previously. Light source 58, FIG. 9, may be used to supply the light for both fiber rods 134 and 135, or separate light sources may be used. FIG. 14 is a typical copy of an oscilloscope picture made with this embodiment. The lower trace 141 is from the leading head 132. The upper trace 142 is from the trailing head 133. Note that common voids appear later in time on the upper trace. With a known common time base (sweep rate of the oscilloscope) the displacement in time between the appearances of a common void, divided into the known head separation 130 gives the flow velocity. Of course, some voids will not be common to both heads, that is, a void may appear on the leading head and dissipate before reaching the trailing head, or a void may start forming after its position in the flow has passed the leading head. Thus, sweep traces will rarely appear to be identical with only a time displacement. The voids also may change shape in traveling the distance between heads varying the characteristics of the displayed traces. Also, since the heads are displaced transversely in the flow a finite amount, some voids indicated on one head will not pass the other head. However, it is rare for any sweep not to contain a void, or voids, that may be used to determine flow velocity. For instant, in the typical single sweep shown in FIG. 14 the time intervals 143 and 144 are very nearly the same and may be used to calculate the flow velocity.

Another utility of embodiments of the probes as previously described is that of triggering x-ray equipment so that an x-ray picture may be made of a void. To randomly, in time, take x-ray pictures of a multi-component flow not knowing whether a void is present in the x-ray beam is very inefficient and wasteful. The disclosed probe structure and associated apparatus as shown in FIG. 9 may be used to trigger the x-ray generator 151 when a void appears at the probe 56. The x-ray film then upon developing will show the cross section of the flow through an area about the probe and the outline of the void detected by the probe. The x-ray equipment and the trigger of it are well known conventional items and techniques. The output on line 153 from the photomultiplier 59 for a typical sweep interval is shown in FIG. 15. The triggering level to fire the x-ray is set at some arbitrary level 154 as shown in FIG. 15. FIG. 15 is a typical oscilloscope trace from a light receiving fiber of a typical probe positioned in a multi-component flow. When the reflection from a void such as indicated 155 exceeds this level the x-ray system is triggered at time 156 and takes a picture. If the x-ray equipment 151 does not have enough electrical signal sensitivity to trigger directly from the photomultiplier output, obviously additional amplification may be inserted in the line 153 between the photomultiplier and the x-ray. For merely triggering x-ray equipment or just the detection of voids, obviously only one light receiving fiber optic rod is needed. That is, embodiments are constructed with a single head such as shown by head 132 in FIG. 13. The x-ray equipment may also be triggered to take a picture only when voids large enough to be detected by both heads when embodiments of the probe as shown in FIG. 1 are used. Those skilled in the art will readily combine embodiments as previously described to provide probes giving void sizes, characteristics, flow velocities, component densities, and the taking of x-ray pictures only under specific conditions of flow in homogenities. The probes as previously described have been used with complete satisfaction in various flows containing particles in suspension varying in size from 1 to 100 microns with typical volume percentages of the particles in the flows ranging from 1 to 10 percent. The physical size of the probes may readily be made smaller than those described in detail, as indicated, or for flows of relatively large cross section flow area with relatively large particle sizes the probes may accordingly be made correspondingly larger.

I claim:

1. A multi-component flow probe for examination of multi-component particle flows having a direction of flow through a confined space comprising:
   a. a first fiber optic rod, a second fiber optic rod, and a third fiber optic rod having a first end of each of the said rods positioned in line parallel light insulating relationship and formed in a common wedge, the said wedge having an included angle within the range of 25° to 35°, the said point of the said common wedge having a radius from two to four times the average particle radius, and the second ends of the said first, second, and third fiber optic rods having flat polished surfaces substantially perpendicular respectively to their rod axes;
   b. means for positioning the said common wedge of the said first ends of the said first, second, and third fiber optic rods in the said multi-component flow with the said wedge pointing substantially against the said direction of particle flow, and with the second ends of the said first, second, and third fiber rods exterior to the said confined space;
   c. a light source communicating with the said second end of the said first fiber optic rod directing light into the said multi-component flow; and
   d. means cooperating with the said second ends of the said second and third fiber optic rods for detecting the reflected light from the said multi-component flow.

2. A multi-component particle flow probe for determining the flow velocity of a multi-component particle flow comprising:
   a. a first, a second, a third and a fourth fiber optic rod each having a first end and a second end;
   b. means for light insulating the said first, second, third and fourth fiber optic rods;
   c. the said first ends of the said first and second fiber optic rods formed in a first common wedge having an included wedge angle from 25° to 35° and with a wedge tip radius approximately equal to the average diameter of the said particle size of the said multi-component flow;
   d. the said first ends of the said third and fourth fiber rods formed in a second common wedge having an included wedge angle from 25° to 35° and with a wedge tip radius approximately equal to the average diameter of the said particle size of the said multi-component flow;
   e. means for positioning the said first and the said second common wedges, a determined distance apart, measured in the direction of the said multi-component flow, with the said first and said second common wedges pointing substantially against the direction of the said flow;
   f. a light source cooperating with the said second ends of the said first and third fiber optic rods; and
   g. means having a common time base cooperating with the said second ends of the said second and fourth fiber optic rods for detecting the light reflected from the multi-component flow into the said first ends of the said second and fourth fiber optic rods.

* * * * *